Feb. 19, 1935.   A. KINDELMANN ET AL   1,991,508
FILM FOOTAGE INDICATOR FOR AMATEUR FILM MAGAZINES
Filed Jan. 5, 1932
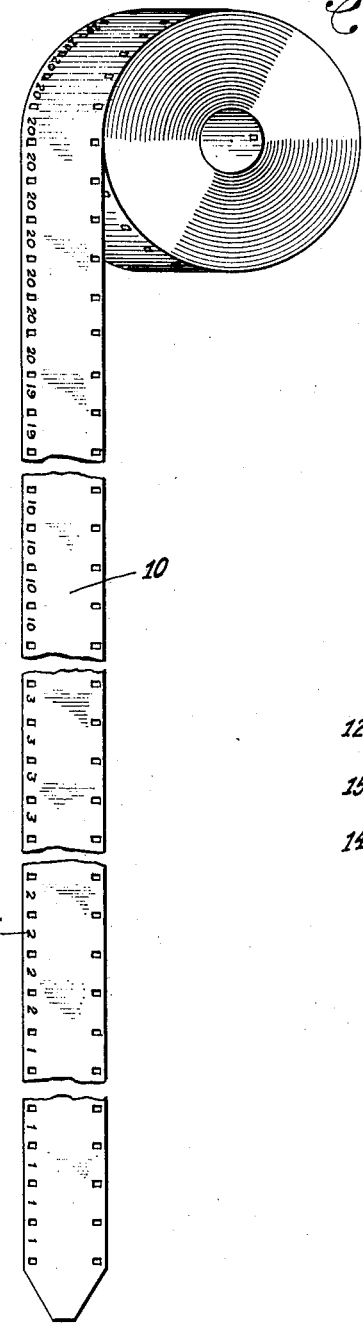
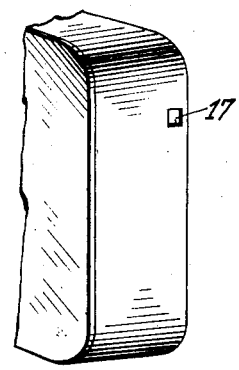
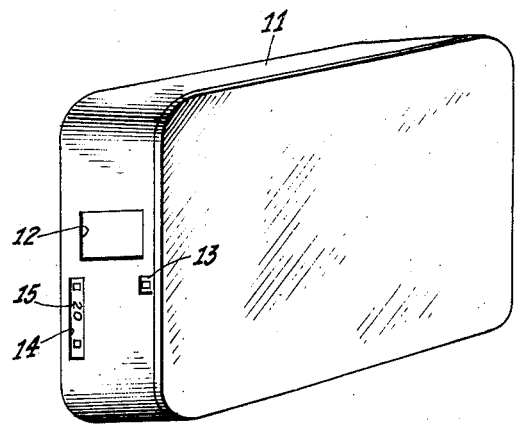
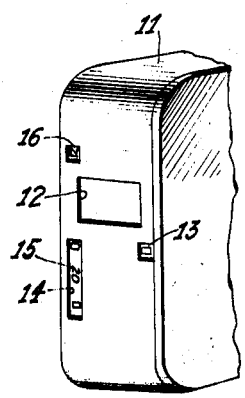
INVENTORS
Albert Kindelmann.
Julius Pearlman.
BY
Austin + Dix
ATTORNEYS Patented Feb. 19, 1935

1,991,508

UNITED STATES PATENT OFFICE 1,991,508

FILM FOOTAGE INDICATOR FOR AMATEUR FILM MAGAZINES

Albert Kindelmann, Floral Park, and Julius Pearlman, New York, N. Y., assignors to International Projector Corporation, New York, N. Y., a corporation of Delaware Application January 5, 1932, Serial No. 584,774

3 Claims. (Cl. 88—17)

This invention relates to new and useful improvements in apparatus for taking motion pictures and has especial reference to such apparatus which employs removable film magazines, especially in cameras and projectors and in small amateur motion picture cameras.

An object of the invention is to provide simple, compact, and efficient film and magazine structure whereby the amount of film which has been exposed within a removable magazine can be instantly determined by examining the film without removing it from the magazine or opening the magazine or in any way detrimentally affecting either the film which has been exposed or the film yet to be exposed.

A further object is to provide a simple and efficient removable magazine provided with film having footage numbers thereon and with means whereby these numbers may be readily observed while the film is in the magazine by merely looking at one or more points of the magazine.

Another object of the invention is to provide a combination of numbered film and its carrying magazine so that by observing at one or more points of the magazine the length of film which has been exposed may be readily noted.

A still further object is to provide a film magazine having film therein with simple means whereby the footage numbers can be readily observed either by removing the magazine from the apparatus or in some cases without removing the magazine from the apparatus whereby the amount of film already exposed can be instantly determined without in any way detrimentally affecting the film.

Further and more specific objects, features and advantages will more clearly appear from a consideration of the specification hereinafter taken in connection with the accompanying drawing which forms part of the specification and which illustrates a present preferred form of the invention.

Briefly considered the invention relates to the provision of motion picture apparatus such as cameras and projectors and including small amateur motion picture cameras with removable film magazines containing predetermined lengths of film having thereon footage numbers. Each magazine is provided with a suitable opening through which the footage numbers may be observed so that the operator upon examining this opening may instantly tell how much film has been exposed and be able to calculate instantly how much unexposed film there is left in the magazine.

The opening in the magazine for such observation may be so disposed as to permit this examination without removing the magazine from the apparatus or the opening may be so disposed as to be capable of examination only by removing the magazine from the apparatus. In either event, however, this examination may take place without in any way affecting the film in the magazine and without moving it. It is also possible that the footage numbers on the film may be so disposed that they can be examined through the openings already provided in one face of the magazines of this kind. One of such openings is now provided for the operation of the feed claws. Preferably, however, the opening for examination of footage numbers is intended to be an opening in addition to the claw opening or the registration pin opening and disposed preferably in line with the series of footage numbers disposed on the film. These numbers are preferably disposed at the side of the film along the line of the sprocket holes. After the magazine is placed in the apparatus, and by means of this simple indicating device, the operator may know exactly what point of the film is at the opening and when he takes the magazine from the apparatus he knows exactly how much film has been exposed without any need to refer to mechanically operated indicating means which may or may not be accurate. With this invention the operator may observe the numbers on the film itself through the opening in the magazine.

The invention in its present preferred form is illustrated in the drawing, in which:

Fig. 1 is a perspective view of a roll of film showing the footage numbers disposed preferably along one edge thereof in line with the sprocket holes in the film which are engageable by the feed claw of the apparatus;

Fig. 2 is a perspective view of a front face of a film magazine;

Fig. 3 is a view of a magazine showing the sight openings as separate from the elongated opening shown in Fig. 2; and Fig. 4 is a perspective view of the rear of the magazine and the auxiliary opening formed in line with the footage numbers on the film on the back face of the magazine so that the footage can be observed without taking the magazine out of the camera.

In the drawing the preferred form of the invention is illustrated which shows the footage numbers of the film and which shows a magazine adapted to exhibit these numbers through the usual claw opening and also a form of magazine in which an additional opening is provided for the observation of the footage numbers. It is, of course, to be understood that this inspection opening can be disposed on any surface of the magazine such as the top or the back so long as such opening is in line with the footage numbers.

In the drawing details of the invention are disclosed as follows with reference to the film. The preferred film 10 is provided preferably along its one edge with the usual sprocket holes and with a series of numerals 15 thereon indicating the successive footage of the film. This film is disposed in any suitable manner within a film magazine 11 and is adapted to be moved past an aperture opening 12 for exposing the film. This movement is achieved by the operation of a claw, not shown, engaging one line of sprocket holes through an elongated claw opening 14. In the form of the invention shown in Fig. 2 the footage numbers 15 are observable through a separate opening 16 which is shown preferably as in linear alignment with the elongated opening 14, but separate therefrom. This auxiliary opening 16 may be disposed as shown or on any other part of the surface of the magazine, for instance it may be on the top or in the back and is always in line with the row of footage numbers whether those numbers are disposed along the line of sprocket holes as shown or disposed on the film in any other alignment. In Fig. 4 the auxiliary opening 17 is shown on the rear face of the magazine so that the footage can be noted without taking the magazine from the camera. Film in that case must be held close to the magazine wall by passing through a suitable channel so that as the film passes aperture 17, only that portion of the film having the sprocket holes and the numbers, will show through aperture 17. When there is no channel at the back of the magazine, then auxiliary opening 17 is dispensed with and opening 16 is depended upon.

It will be observed from a consideration of the above description of the general features and the construction of the preferred form that there is provided a simple and efficient means whereby a film having footage numbers thereon and which is disposed within a magazine can be readily examined while in the magazine to determine the amount of film which has been exposed at any instant of time either while the magazine is in the apparatus or by simply removing the magazine from the apparatus and quickly examining it without injuring the film. The film in the magazine must be sensitive or it would be of no practical value in being used in the camera. It must be light sensitive in order to take pictures. The withdrawing of the magazine from the camera would be for the purpose of determining whether the film is being properly moved for exposure, and if the magazine is not light proof, then the film would be injured by being "light struck" and would be of no value.

The provision of a special aperture for the inspection of these footage numbers is important in certain practical arrangements especially where it is desired to observe the footage exposed without removing the magazine. In cases, however, where the magazine is to be removed before making this examination the additional aperture may or may not be employed because in this instance the usual elongated claw opening may be made use of for this purpose. However, the invention is intended, and in this produced conception covers the combination of a film having footage numbers thereon disposed in a magazine, preferably a removable magazine, and provided with an aperture through which these numbers may be readily observed without in any way disturbing or affecting the film within the magazine and requiring a very minimum of time and effort on the part of the operator to achieve this result and without interfering with the operation of the mechanism any more than to the slightest extent.

With this novel combination of numbered film and removable magazine, it will be appreciated that should the magazine not be properly positioned in the camera by the amateur operator or other person, it will be noted upon removing the magazine or upon observing the special opening in the magazine that the film has not been exposed. This will prevent sending an unexposed film back to the factory to be developed, the operator believing that all of the film has been exposed.

It is to be pointed out herein that as noted above there is a definite and specific combination of a definite type of film and a definite type of magazine for holding the film. It is to be further pointed out that if the film is to be exposed to take pictures, that it is a sensitized film. Also, it may be pointed out again that the magazine may be taken from the camera and inspected without injuring the film, except for the single exposure which happens to be exactly in front of the exposure opening in the magazine. Thus, the magazine must be light tight or light proof, or would have no practical use for holding film. The magazine here employed is such that it may be removed from the camera without injuring the film.

It therefore will be noted that there is a combined light proof magazine with a particular type of film therein having footage numbers thereon and so positioned in respect to one or more openings that the film may be inspected to note how much has been exposed, or if the sprocket holes have given way, then the operator will note without spoiling the film, that it is not being exposed. The operator can then move the film forward a small amount and then insert it in the camera; thus, new sprocket holes will be engaged by the claw provided for moving the film. This is all done without injuring or "light striking" the film and allows the operator to note upon any inspection that the film is being moved and exposed in the intended fashion, and also allows the operator to calculate the footage which has been exposed.

While the invention has been described in detail and with respect to a present preferred form thereof, it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What is claimed, is:

1. In combination a moving picture film magazine adapted to be inserted in a moving picture camera, moving picture film mounted in said magazine at the factory where the magazine is sealed against light except at an exposure opening in front of which the film is moved to be exposed, said film being numbered to indicate the footage of film that has passed a definite point, said magazine being provided with an inspection opening in that surface thereof which is the last to pass into the camera when the magazine is inserted in the camera, said inspection opening being formed in the wall of the magazine to register with the number on the film.

2. In combination a moving picture film magazine adapted to be inserted in a moving picture camera, moving picture film mounted in said magazine at the factory where the magazine is sealed against light except at an exposure opening in front of which the film is moved to be exposed, said film being numbered to indicate the footage of film that has passed a definite point, said magazine being provided with an inspection opening in that surface of the magazine opposite the surface having the aperture opening therein, said inspection opening being located to register with the numbers on the film.

3. In combination a moving picture film magazine adapted to be inserted in a moving picture camera, motion picture film mounted in said magazine at the factory said magazine being light-sealed at the time of filling and which seal is not broken until the magazine is returned to the factory after exposure of the film, said magazine being provided with an aperture opening in front of which each exposure section of said film passes and having an opening through which a claw moves to engage the film to move said film in front of said aperture, said film being numbered on that portion which passes the claw opening so as to allow the magazine to be removed from the camera and inspection made through said claw opening as to the footage of the film already exposed and then to be returned to the camera with a loss by light exposure of only one exposure section of said film, said magazine also being provided with an inspection opening in one of its surfaces other than the surface having the aperture opening therein, said inspection opening being located in said magazine surface so as to register with the number on the film thereby to allow inspection of the approximate length of film that has been exposed without withdrawing said magazine from its mounting in the camera.

ALBERT KINDELMANN.
JULIUS PEARLMAN.